United States Patent
Kaneko

(10) Patent No.: US 7,120,475 B2
(45) Date of Patent: Oct. 10, 2006

(54) FOLDING CELLULAR PHONE AND SLIDE CELLULAR PHONE

(75) Inventor: Yasuhiro Kaneko, Saitama (JP)

(73) Assignee: NEC Corporation, Tokyo (JP)

(*) Notice: Subject to any disclaimer, the term of this patent is extended or adjusted under 35 U.S.C. 154(b) by 427 days.

(21) Appl. No.: 10/373,767

(22) Filed: Feb. 27, 2003

(65) Prior Publication Data

US 2003/0162560 A1 Aug. 28, 2003

(30) Foreign Application Priority Data

Feb. 28, 2002 (JP) .............................. 2002/054884

(51) Int. Cl.
*H04M 1/00* (2006.01)
*H04Q 7/32* (2006.01)

(52) U.S. Cl. ................ 455/575.1; 455/575.3; 455/575.4; 455/415; 455/567

(58) Field of Classification Search ............ 455/575.3, 455/575.4, 90.3, 550.1, 422.1, 415, 567, 455/575.1; 370/271
See application file for complete search history.

(56) References Cited

U.S. PATENT DOCUMENTS

| | | | | |
|---|---|---|---|---|
| 5,918,188 | A * | 6/1999 | Doran ....................... | 455/575.3 |
| 6,094,565 | A * | 7/2000 | Alberth et al. ............ | 455/575.3 |
| 6,215,993 | B1 | 4/2001 | Ulveland | |
| 6,269,256 | B1 * | 7/2001 | Nakamura .................. | 455/567 |
| 6,282,436 | B1 * | 8/2001 | Crisp ....................... | 455/575.4 |
| 6,567,672 | B1 * | 5/2003 | Park et al. .................. | 455/574 |
| 6,621,066 | B1 * | 9/2003 | Kim .......................... | 250/221 |
| 2002/0019216 | A1 * | 2/2002 | Horiguchi .................... | 455/90 |
| 2003/0090438 | A1 * | 5/2003 | Sato et al. .................... | 345/1.1 |

FOREIGN PATENT DOCUMENTS

| | | |
|---|---|---|
| GB | 2 310 568 | 8/1997 |
| GB | 2 372 912 | 9/2002 |
| GB | 2 375 928 | 11/2002 |
| JP | 9-116955 | 5/1997 |
| JP | 9-247251 | 9/1997 |
| JP | 9-261299 | 10/1997 |
| JP | 11-41648 | 2/1999 |
| JP | 11-298573 | 10/1999 |

OTHER PUBLICATIONS

Japanese Office Action dated Apr. 11, 2006 with English translation of pertinent portions.

* cited by examiner

*Primary Examiner*—Nay Maung
*Assistant Examiner*—Dominic E. Rego
(74) *Attorney, Agent, or Firm*—Whitham, Curtis, Christofferson & Cook, PC

(57) ABSTRACT

A folding cellular phone and a slide cellular phone with excellent usability. A folding cellular phone 1 has a status detection unit 20 which detects whether the folding cellular phone 1 is in a folded status or an opened status, a memory 21 which holds information to respond to an incoming call by opening the folding cellular phone 1, and a control unit 17 which, if an incoming call is detected when the folding cellular phone is in the folded status, in a case where information on the incoming call is stored in the memory, responds to the incoming call if the status detection unit 20 detects that the folding cellular phone has moved to the opened status.

32 Claims, 8 Drawing Sheets

FOLDING CELLULAR PHONE AND SLIDE CELLULAR PHONE

BACKGROUND OF THE INVENTION

1. Field of the Invention

The present invention relates to a folding cellular phone and a slide cellular phone, and more particularly, to a folding cellular phone and a slide cellular phone which responds to an incoming call when it is opened/closed or slid.

2. Related Art of the Invention

In a conventional folding cellular phone, when an incoming call is received, in order to respond to the incoming call, two steps of operations are necessary. That is, a main body is opened and then an off-hook key is depressed.

However, in the conventional folding cellular phone, as the two steps of operations are required to respond to an incoming call, the usefulness is lower in comparison with an straight type cellular phone. Further, in the folding cellular phone which does not provide a small-window display unit for display of clock, battery indicator, call originator's telephone number upon reception of incoming call and the like in a closed status, when an incoming call is received, a call originator is unknown until the phone is opened. Accordingly, if the status of the cellular phone moves to a communication status even by opening the phone body, it is impossible for a user to select to answer or not to answer the incoming call in accordance with the originator of the incoming call.

SUMMARY OF THE INVENTION

To solve the above problems, a folding cellular phone according to the present invention comprises: a status detection unit that detects whether the case is in a folded status or an opened status; and a control unit that, if an incoming call is detected when the case is in the folded status, determines whether or not incoming call information on the incoming call has been notified, and if the incoming call information has been notified, responds to the incoming call by detecting that the case has moved to the opened status.

Note that as the incoming-call information, a number of call originator (call originator number) notified from e.g. a network may be used.

The above folding cellular phone further comprises a memory that holds identification information to identify a call originator. If an incoming call is detected when the case is in the folded status, the control unit determines whether or not the incoming call information on the incoming call notified from a network includes the identification information. If the incoming call information includes the identification information, the control unit responds to the incoming call by detecting that the case has moved tot he opened status.

It may be arranged such that the above folding cellular phone, further comprises an informing unit that, if the incoming call information includes the identification information, informs that the incoming call information includes the identification information. The informing unit performs a particular action by screen display, light, sound, vibration or the like.

It may be arranged such that the above folding cellular phone further comprises an acceleration sensor that detects a particular external force, and in a case where the acceleration sensor has detected a particular external force, if the status detection unit detects that the case has moved to the opened status, the control unit responds to the incoming call.

A slide cellular phone according to the present invention is a slide cellular phone used in a status where a second case which slides with respect to a first case is pulled out, upon communication, comprising: a status detection unit that detects whether the second case is in a closed status or a pulled out status; and a control unit that, if an incoming call is detected when the second case is in the closed status, determines whether or not incoming call information on the incoming call has been notified, and if the incoming call information has been notified, responds to the incoming call by detecting that the second case has moved to the pulled out status.

Also, as the incoming-call information, a number of call originator (call originator number) notified from e.g. a network may be used.

It may be arranged such that the above slide cellular phone further comprises a memory that holds identification information to identify a call originator. If an incoming call is detected when the second case is in the closed status, the control unit determines whether or not the incoming call information on incoming call notified from a network includes the identification information, and if the incoming call information includes the identification information, the control unit responds to the incoming call by detecting that the second case has moved to the pulled out status.

It may be arranged such that the above slide cellular phone further comprises an informing unit that, if the incoming call information includes the identification information, informs that the incoming call information includes the identification information. The informing means performs a particular action by screen display, light, sound, vibration or the like.

It may be arranged such that the above slide cellular phone further comprises an acceleration sensor that detects a particular external force, and in a case where the acceleration sensor has detected a particular external force, if the status detection unit detects that the second case has moved to the pulled out status, the control unit responds to the incoming call.

DETAILED DESCRIPTION OF THE PREFERRED EMBODIMENTS

The present invention has been made so as to solve the above-described problems, and has an object to provide a folding cellular phone and a slide cellular phone providing excellent usability. Hereinbelow, embodiments of the present invention will be described in detail with reference to the drawings.

[First Embodiment]

Figure 1A:
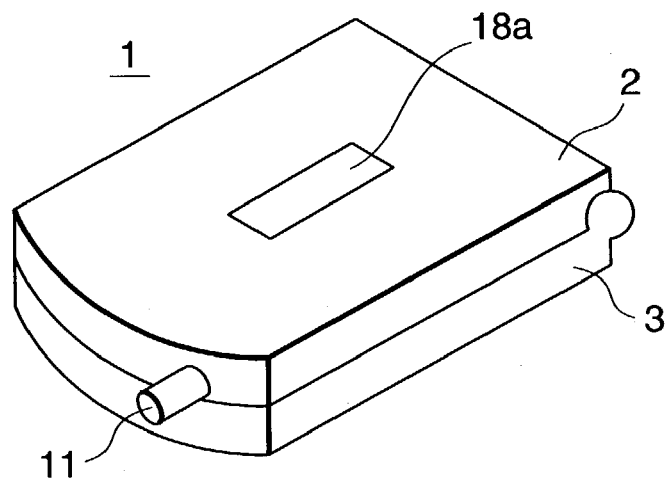
FIG. 1A is a perspective view showing a status where a folding cellular phone is closed.
Figure 1B:
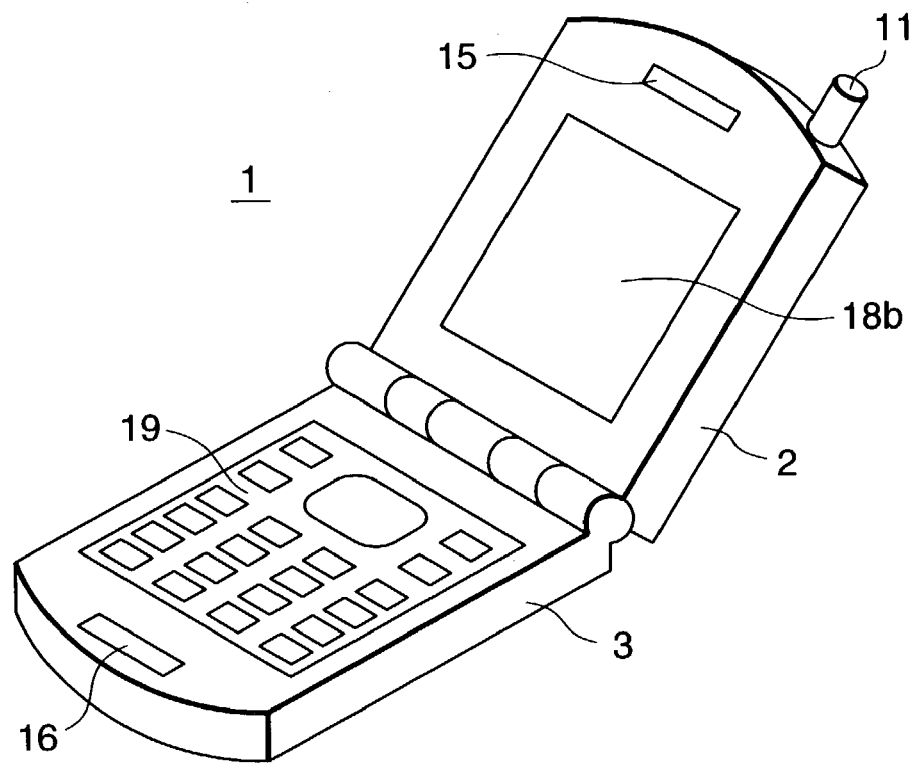
FIG. 1B is a perspective view showing a status where the folding cellular phone is opened.

FIG. 1A is a perspective view showing a status where a folding cellular phone is closed. FIG. 1B is a perspective view showing a status where the folding cellular phone is opened.

A folding cellular phone 1 has an upper case 2 and a lower case 3 hinge-connected at the respective ends. For the sake of convenience, in the upper case 2 and the lowercase 3, a surface opposite to the upper case 2 and the lower case 3 in a status where the folding cellular phone 1 is folded is referred to an inner surface, and a surface exposed to the outside of the cellular phone, an outer surface.

Note that the status where the folding cellular phone 1 is opened means a status as shown in FIG. 1B in which the distance between respective ends opposite to the hinged ends of the upper case 2 and the lower case 3 is the maximum.

The upper case 2 has a small-window display unit 18a including a liquid crystal display, an organic EL (Electro Luminescence) display or the like for display of clock, battery indicator, call originator's telephone number upon reception of incoming call and the like, on the outer surface. Further, the upper case 2 has a speaker 15, a main display unit 18b including a liquid crystal display, an organic EL display or the like, on the inner surface. An antenna 11 is provided on an outer edge of the end of the upper case 2 opposite to the end hinged with the lower case 3.

The lower case 3 has a microphone 16 and an operation unit 19 including keys, buttons and the like, on the inner surface.

The construction of the folding cellular phone 1 having the above appearance will be described with reference to FIG. 2.

Figure 2:
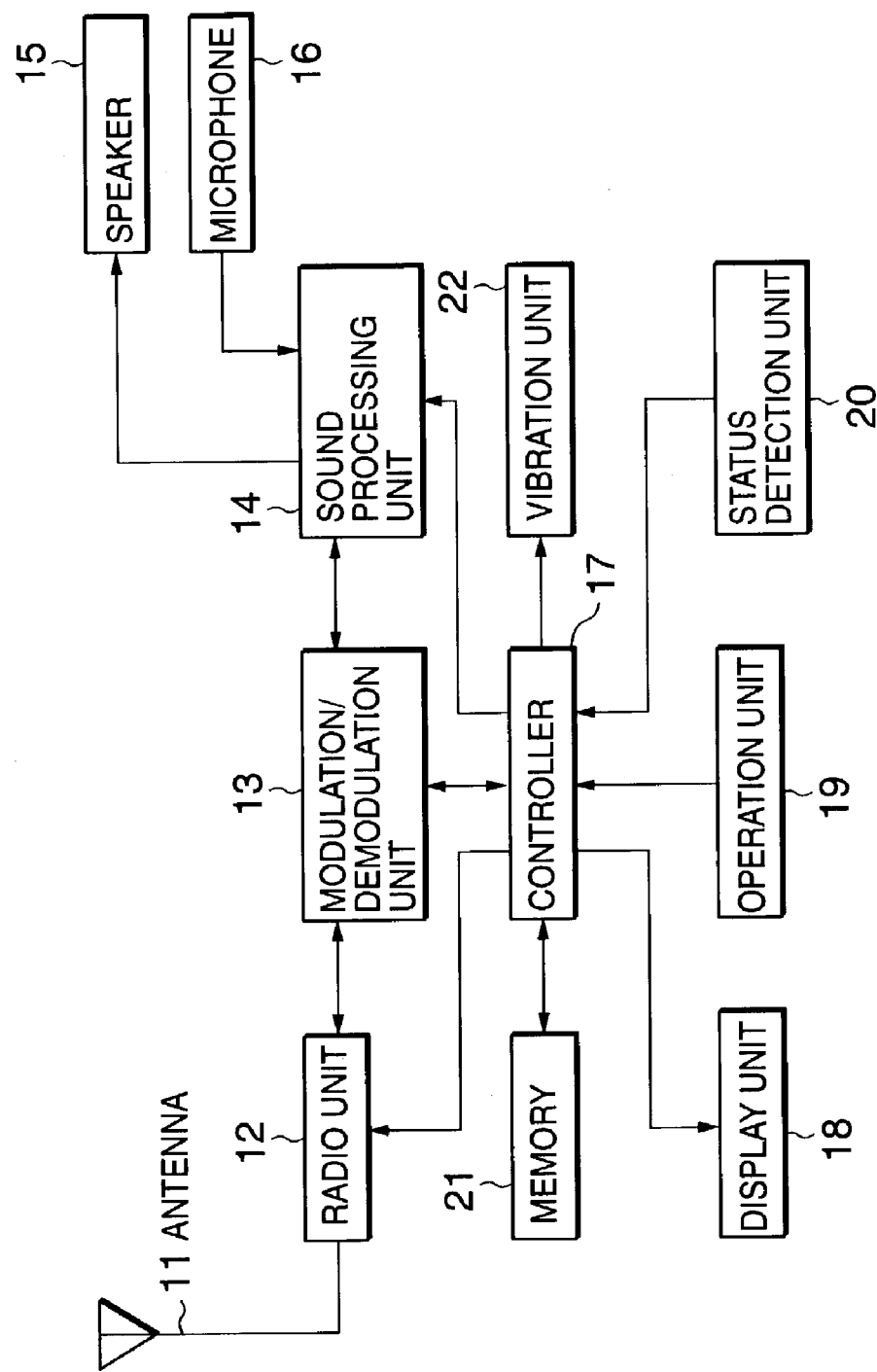
FIG. 2 is a block diagram showing the construction of the folding cellular phone according to a first embodiment and a slide cellular phone according to a third embodiment.

FIG. 2 is a block diagram showing the construction of the folding cellular phone according to the first embodiment. As shown in FIG. 2, the folding cellular phone 1 has an antenna 11, a radio unit 12, a modulation/demodulation unit 13, a sound processing unit 14, the speaker 15, the microphone 16, a controller 17 which controls the overall folding cellular phone 1, a display unit 18, an operation unit 19, a status detection unit 20, a memory 21 and a vibration unit 22.

The outline of operation of the folding cellular phone 1 having the above construction will be described.

When a radio wave signal to the folding cellular phone 1 is received by the antenna 11, then amplified and frequency-converted by the radio unit 12, and outputted to the modulation/demodulation unit 13. The modulation/demodulation unit 13 demodulates the signal and outputs the demodulated signal to the sound processing unit 14. The demodulated signal from the modulation/demodulation unit 13 is decoded to a sound signal by the sound processing unit 14 and then reproduced by the speaker 15. On the other hand, a sound signal inputted from the microphone 16 is passed through an inverse route (that is, decoded by the sound processing unit 14, then modulated by the modulation/demodulation unit 13, and via the radio unit 12), and is transmitted as a radio wave signal from the antenna 11.

The controller 17 performs radio channel control and processing on received data, controls the sound processing unit 14, controls display contents of the display unit 18, performs processing on a signal from the operation unit 19 and processing on a signal from the status detection unit 20, performs writing and reading of information stored in the memory 21, and controls the vibration unit 22.

The display unit 18 has the small window display unit 18a and the main display unit 18b. The controller 17 controls the display contents on the display unit 18.

The operation unit 19 is used by a user of the folding cellular phone 1 for inputting a telephone number or setting various functions.

The status detection unit 20 detects whether the folding cellular phone 1 is in an opened status where the upper case 2 and the lower case 3 are away from each other or in a folded (closed) status, and outputs information on the status of the cellular phone to the controller 17.

The memory 21 holds call originators' telephone numbers registered by the user for answering to incoming call by opening the folding cellular phone 1, setting information, various information set by the user and the like. That is, in the present embodiment, a call originator's telephone number is used as identification information.

Figure 3:
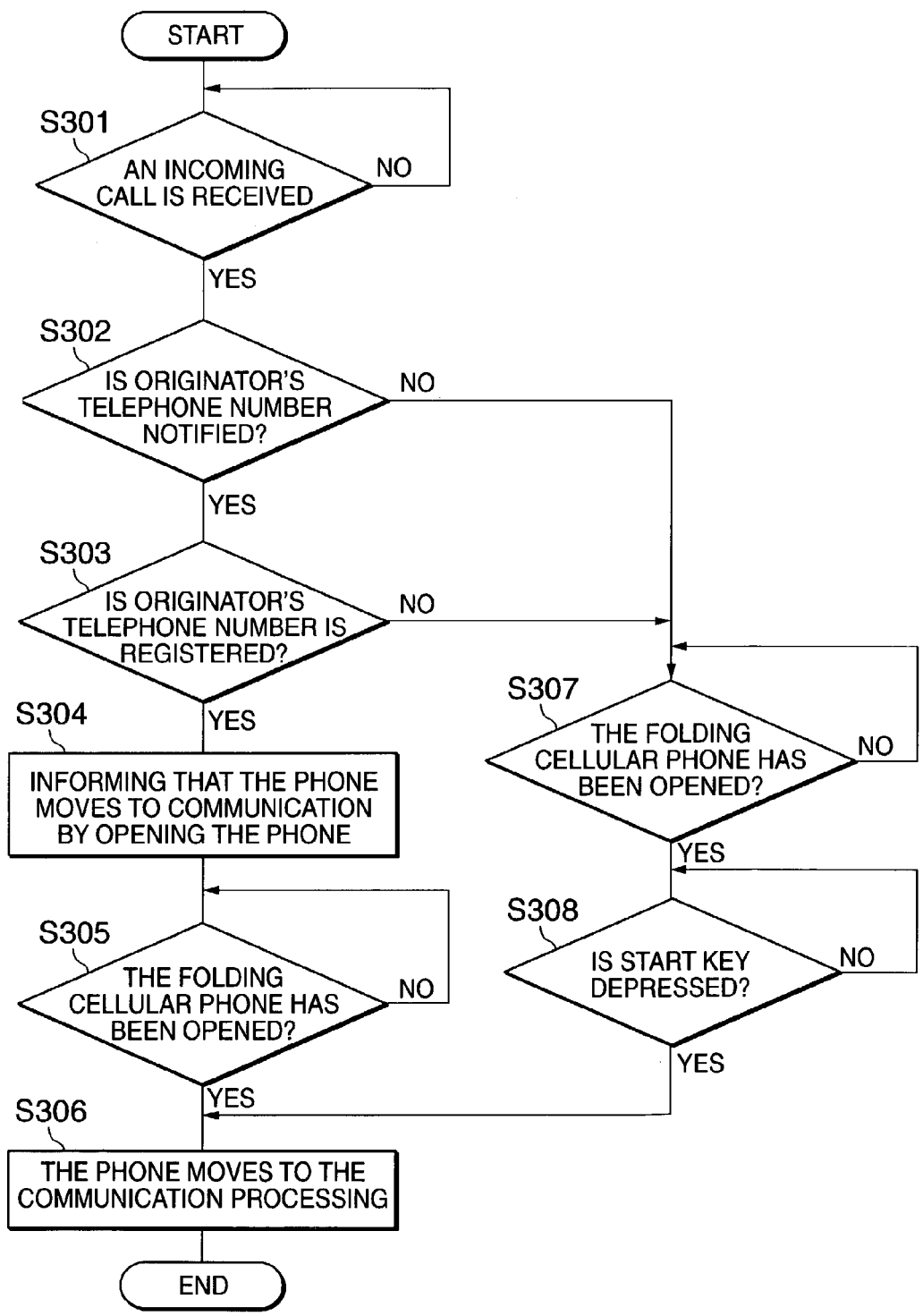
FIG. 3 is a flowchart showing an operation of the folding cellular phone.

Next, operations of principal elements of the folding cellular phone 1 according to the first embodiment will be described in detail with reference to FIG. 3. FIG. 3 is a flowchart showing the operation of the folding cellular phone.

First, in a status where the folding cellular phone 1 is closed, when the antenna 11 has received a radio wave signal (YES at step S301), the controller 17 determines whether or not a call originator's telephone number has been notified (step S302).

If a call originator's telephone number has not been notified (NO at step S302), the controller 17 performs normal operation. The "normal operation" means that the status detection unit 20 detects that the folding cellular phone 1 has been opened (YES at step S307), then a communication start key of the operation unit 19 is depressed (YES at step S308), thereby the status of the folding cellular phone 1 moves to communication processing in response to the incoming call (step S306).

If a call originator's telephone number has been notified (YES at step S302), the controller 17 determines whether the notified call originator's telephone number is registered in the memory 21 as a number with which communication is to start by opening the folding cellular phone 1 (step S303).

Herein below, registration of number in the memory 21 for answering to incoming call by opening the folding cellular phone 1 is referred to as "communication setting". Note that the registration as communication setting is previously performed by the user of the folding cellular phone 1 by operating the operation unit 19 in accordance with necessity.

If the notified call originator's telephone number is not registered (NO at step S303), the controller 17 performs the above-described normal operation.

If the notified call originator's telephone number is registered (YES at step S303), the controller 17 at step S304 informs the user that the call originator is registered in the memory 21 as the communication setting and that the status of the cellular phone moves to communication in response to the incoming call by opening the folding cellular phone 1, by, e.g., displaying a message on the small-window display unit 18a, outputting a particular incoming-call sound, vibration by the vibration unit 22 in particular rhythm, or particular light emission by a lamp provided in the folding cellular phone 1 for this purpose. This arrangement enables the user of the folding cellular phone 1 to discriminate that the incoming call has been originated by the call originator registered in the memory 21, and prevents the user from becoming nervous upon answering to the incoming call.

If the status detection unit 20 detects that the folding cellular phone 1 has been opened (YES at step S305), the controller 17 moves to the communication processing in response to the incoming call (step S306), thereby the user can easily answer to the incoming call only by opening the holding cellular phone 1.

Note that in the first embodiment, in the folding cellular phone 1, in a case where a call originator's telephone number is notified and the number is registered in the memory 21 as the communication setting, the status of cellular phone moves to communication by opening the folding cellular phone 1. However, the communication setting can be changed in accordance with necessity. For example, even if a call originator's telephone call number is not notified or an incoming call has been received from a public telephone, setting may be made such that the status of cellular phone moves to communication by opening the folding cellular phone 1. The setting can be easily made by changing the communication setting recorded in the memory 21 by the user's operating the operation unit 19.

Further, in the first embodiment, the user is informed that the status of cellular phone moves to communication by opening the folding cellular phone 1 if the communication setting is made, however, it may be arranged such that the user is not informed that the status of cellular phone moves to communication by opening the folding cellular phone 1 if the communication setting is made.

Further, a call originator's telephone number is used as identification information, however, the identification information is not limited to a call originator's telephone number but any information can be used as long as it is notified from a network and it can be used for specifying a call originator.

[Second Embodiment]

Next, a second embodiment will be described. In the second embodiment, constituent elements corresponding to those of the first embodiment have the same reference numerals and explanations thereof will be arbitrarily omitted.

Figure 4:
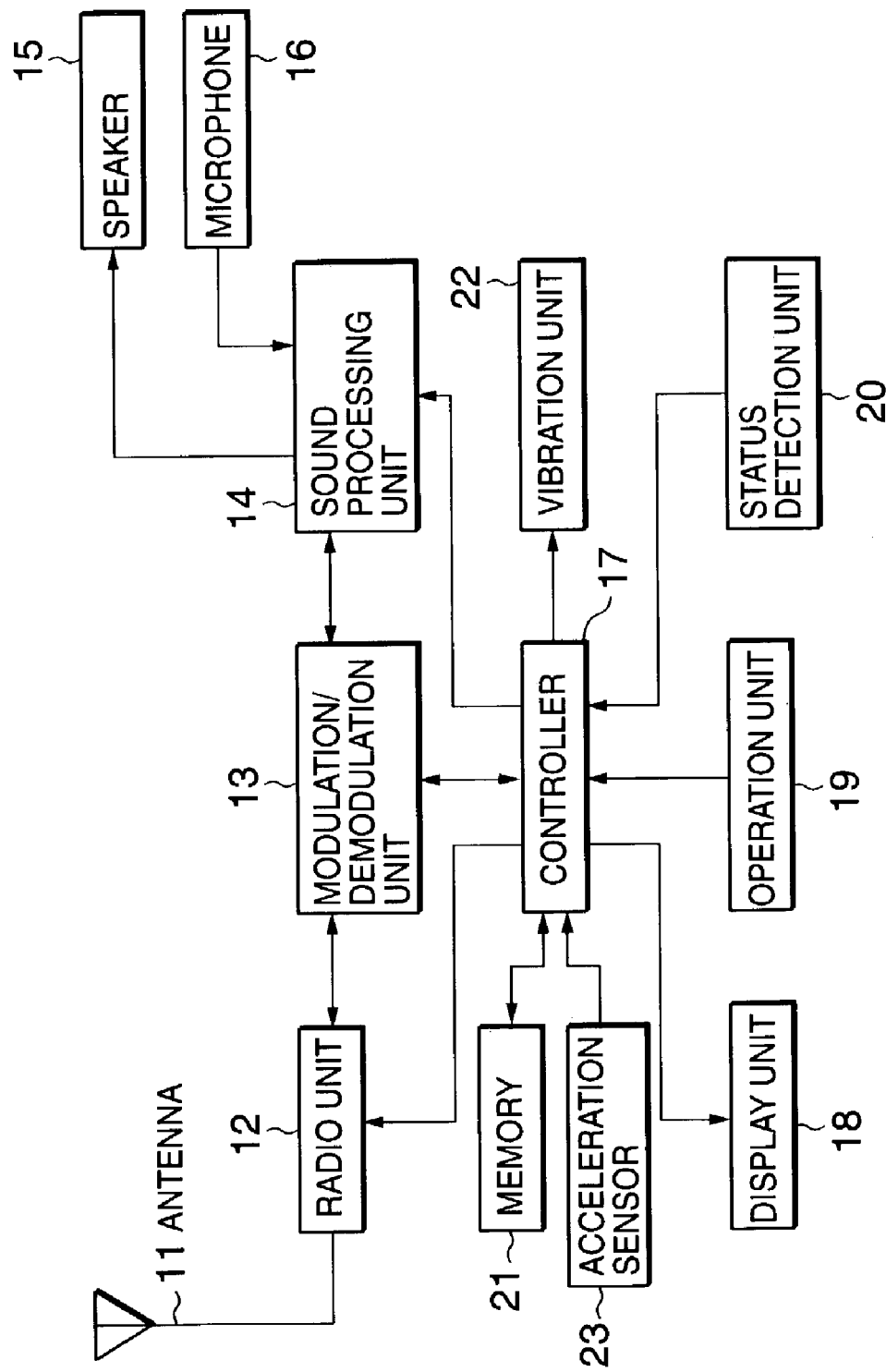
FIG. 4 is a block diagram showing the construction of the folding cellular phone according to a second embodiment and a slide cellular phone according to a fourth embodiment.

FIG. 4 is a block diagram showing the construction of the folding cellular phone according to the second embodiment. In the second embodiment as shown in FIG. 4, an acceleration sensor 23 is added to the construction of the first embodiment as shown in FIG. 2. The acceleration sensor 23 detects an external force applied to the folding cellular phone 1 and outputs a detected value to the controller 17.

Figure 5:
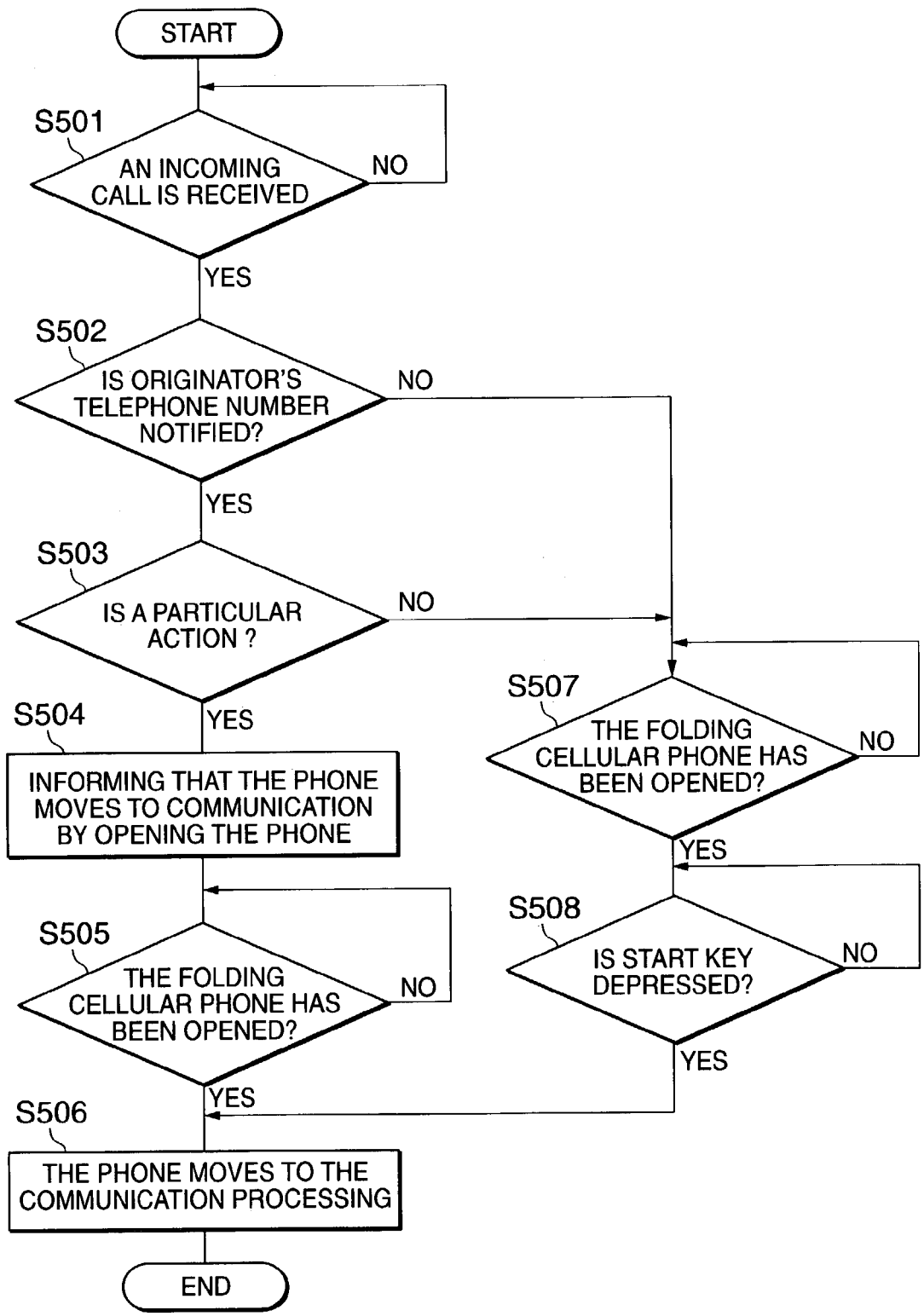
FIG. 5 is a flowchart showing the operation of the folding cellular phone according to the second embodiment.

FIG. 5 is a flowchart showing the operation of the folding cellular phone according to the second embodiment. The operations of the principal elements of the folding cellular phone 1 according to the second embodiment will be described in detail with reference to the flowchart of FIG. 5.

First, in a status where the folding cellular phone 1 is closed, when the antenna 11 has received a radio wave signal (YES at step S501), the controller 17 determines whether or not a call originator's telephone number has been notified (step S502).

If a call originator's telephone number has not been notified (NO at step S502), the controller 17 performs normal operation. The "normal operation" means that the status detection unit 20 detects that the folding cellular phone 1 has been opened (YES at step S507), then a communication start key of the operation unit 19 is depressed (YES at step S508), thereby the status of the folding cellular phone 1 moves to communication processing in response to the incoming call (step S506).

If the call originator's telephone number has been notified (YES at step S502) and is recorded in the memory 21 such that the status of cellular phone moves to communication by detection of particular operation by the acceleration sensor 23, the controller 17 determines whether or not the acceleration sensor 23 has detected a particular action (step S503). The particular action means application of particular external force to the folding cellular phone 1 by, e.g., shaking the folding cellular phone 1 twice in a vertical direction to a display direction of the small-window display unit 18a. In this case, the direction and/or number of times of application of external force by e.g. shaking the folding cellular phone 1 can be arbitrarily and freely set.

Further, as another example of particular action, the folding cellular phone 1 may be opened at a speed equal to or higher/less than a predetermined speed, or may be opened within/after a predetermined period from reception of incoming call.

The particular action is previously set by the user of the folding cellular phone 1 by operating the operation unit 19 in accordance with necessity.

If the acceleration sensor 23 has not detected the particular action (NO at step S503), the controller 17 performs the above-described normal operation.

If the acceleration sensor 23 has detected the particular action (YES at step S503), the controller 17 at step S504 informs the user that the status of cellular phone moves to communication by opening the folding cellular phone 1 by, e.g., displaying a message on the small-window display unit 18a, outputting a particular incoming-call sound, vibration by the vibration unit 22 in particular rhythm, or particular light emission by a lamp provided in the folding cellular phone 1 for this purpose.

If the status detection unit 20 detects that the folding cellular phone 1 has been opened (YES at step S505), the controller moves to the communication processing in response to the incoming call (step S506). By this arrangement, the user of the folding cellular phone 1 can select to answer or not to answer the incoming call by opening the folding cellular phone 1.

Note that in the second embodiment, if a call originator's telephone number is notified and the number is registered in the memory 21, and if the acceleration sensor 23 has detected a particular action, the status of cellular phone moves to communication in response to the incoming call by opening the folding cellular phone 1. However, the communication setting can be changed in accordance with necessity. For example, even if a call originator's telephone call is unnotified or an incoming call has been received from a public telephone, setting may be made such that the status of cellular phone moves to communication by detection of particular action by the acceleration sensor 23 and opening the folding cellular phone 1.

Further, it may be arranged such that the status of cellular phone moves to communication by detection of particular action by the acceleration sensor 23 and opening the folding cellular phone 1 regardless of notification of call originator's telephone number.

Note that these settings can be easily made by changing the communication settings recorded in the memory 21 by the user's operating the operation unit 19.

Further, in the second embodiment, in the folding cellular phone 1, setting may be made such that the user cannot answer to an incoming call by opening the folding cellular phone 1 unless the acceleration sensor 23 has detected a particular action. By this arrangement, the folding cellular phone 1 can be prevented from being used by another person not authorized by the user.

Further, in the second embodiment, if the folding cellular phone 1 is opened in a case where the acceleration sensor 23 has detected a particular action, the user is informed that the status of cellular phone moves to communication by opening the folding cellular phone 1. However, it may be arranged such that the user is not informed that the status of cellular phone moves to communication by opening the folding cellular phone 1 in a case where the communication setting is made.

[Third Embodiment]

Next, a third embodiment will be described.

Figure 6A:
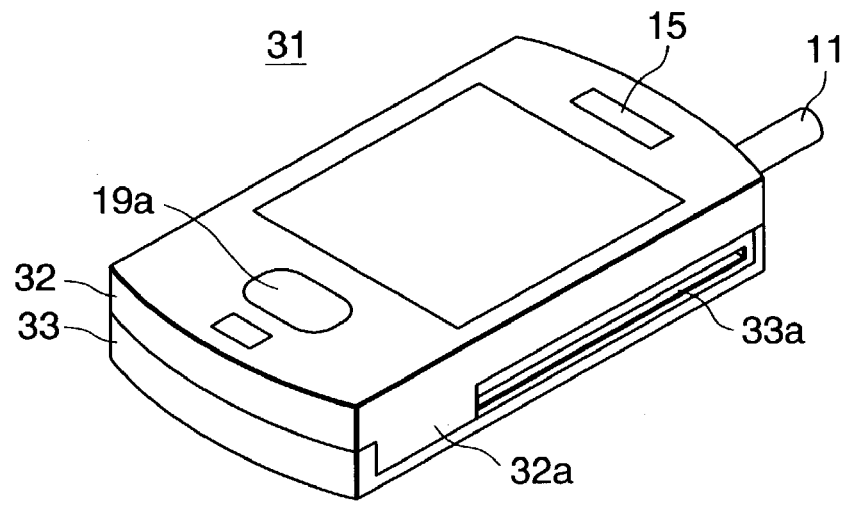
FIG. 6A is a perspective view showing a status where, the slide cellular phone is closed.
Figure 6B:
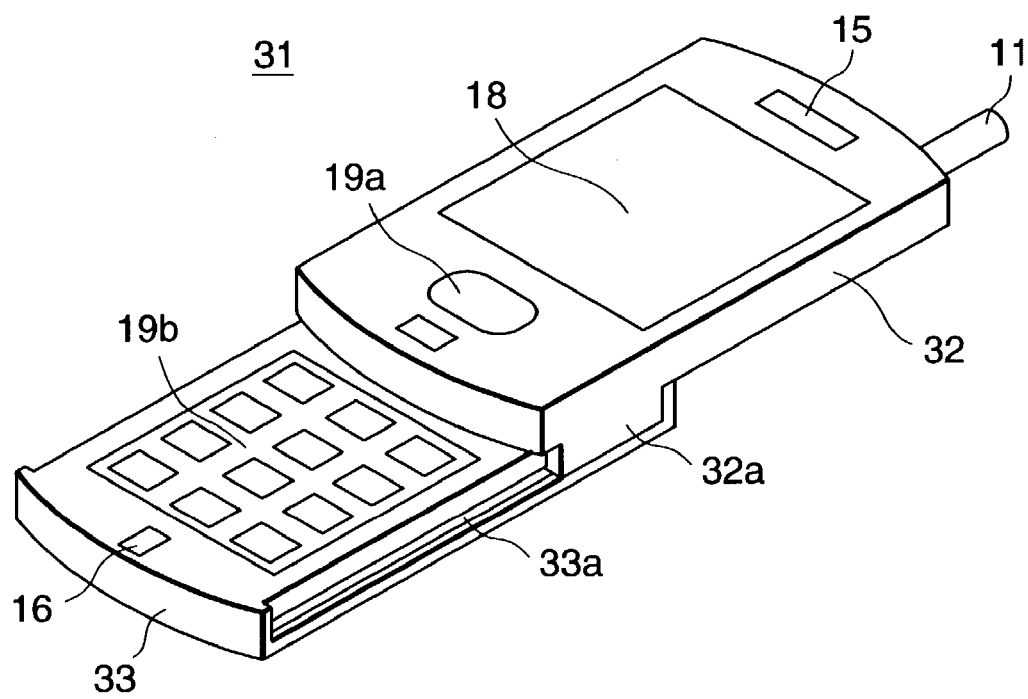
FIG. 6B is a perspective view showing a status where the slide cellular phone is pulled out.

FIG. 6A is a perspective view showing a status where a slide cellular phone is closed. FIG. 6B is a perspective view showing a status where the slide cellular phone is pulled out. Note that since the third embodiment is application of the first embodiment to a slide cellular phone, corresponding constituent elements have the same reference numerals and explanations thereof will be arbitrarily omitted. Note that window 18*a* shown in FIG. 1A used in the first embodiment is not required since window 18 is visible when the slide cellular phone is closed.

In a slide cellular phone 31, a slide member 32*a* of an upper case 32 is engaged with a groove 33*a* provided in side surfaces of a lower case 33. When the upper case 32 and the lower case 33 are slid in opposite directions to each other in a lengthwise direction of the groove 33*a*, the lower case 33 is pulled out as shown in FIG. 6B from the status of FIG. 6A, and a main operation unit 19*b* and the microphone 16 are exposed. In the upper case 32, the speaker 15, the display unit 18 and a sub operation unit 19*a* are provided on a surface opposite to the lower case 33. Further, the antenna 11 is provided on an outer edge of the end of the upper case 32 closer to the speaker 15.

In the slide cellular phone 31 having the above construction, setting is made such that the status of cellular phone moves to communication in response to an incoming call by pulling out the lower case 33.

Note that the status where the slide cellular phone 31 is pulled out (pulled out status) means a status where the length of the slide cellular phone 31 is the maximum in the direction of the groove 33*a* as shown in FIG. 6B.

The construction of the slide cellular phone 31 having the above appearance will be described with reference to FIG. 2.

The status detection unit 20 detects whether the slide cellular phone 31 is in the pulled out status or in the closed status and outputs information on the status of the cellular phone to the controller 17.

Since the other constituent elements have been described in the first embodiment, explanations thereof will be omitted.

Figure 7:
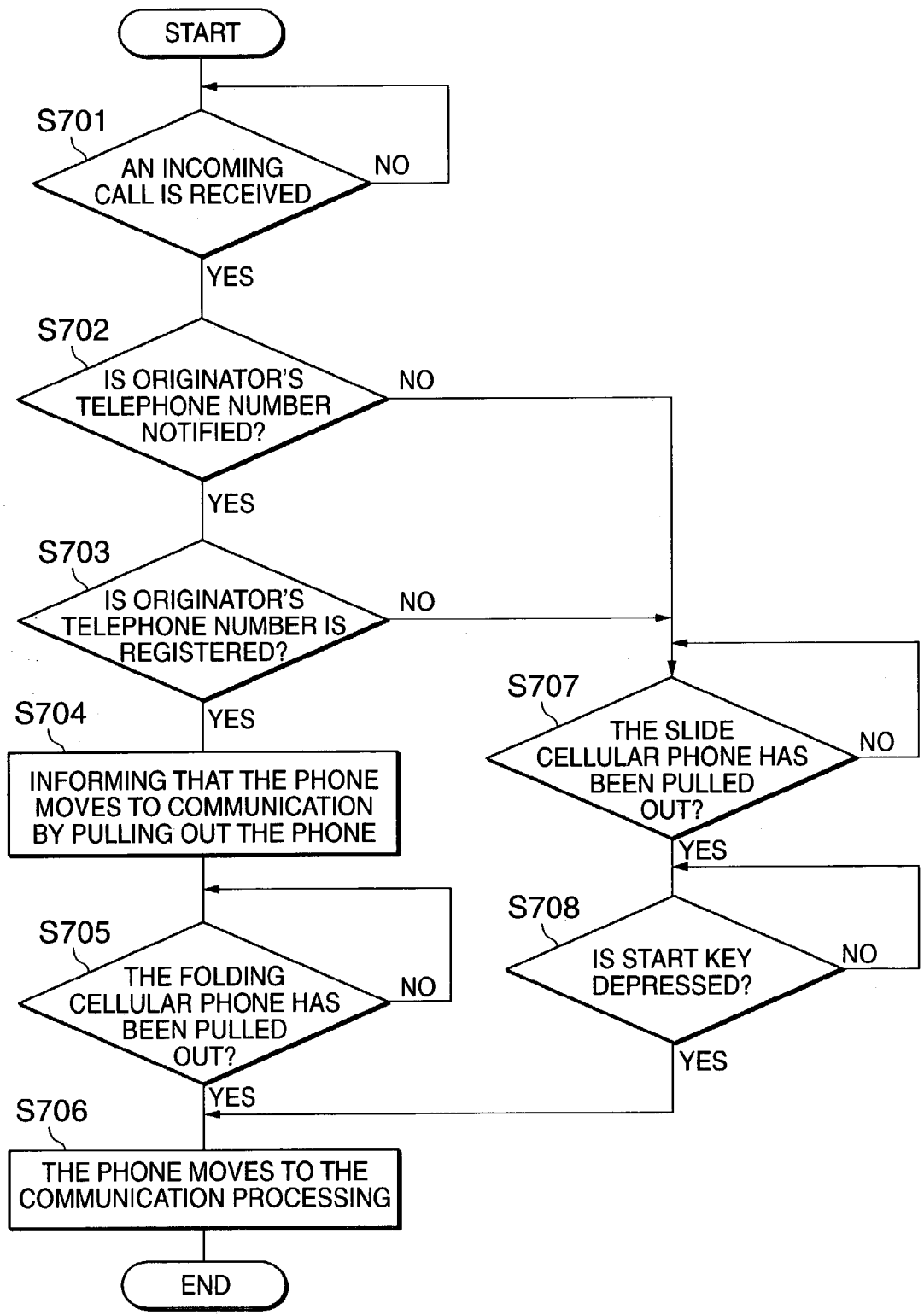
FIG. 7 is a flowchart showing an operation of the slide cellular phone according to the third embodiment.

Next, operations of principal elements of the slide cellular phone 31 according to the third embodiment will be described in detail with reference to FIG. 7. FIG. 7 is a flowchart showing the operation of the slide cellular phone.

First, in a status where the slide cellular phone 31 is closed, when the antenna 11 has received a radio wave signal (YES at step S701), the controller 17 determines whether or not a call originator's telephone number has been notified (step S702).

If a call originator's telephone number has not been notified (NO at step S702), the controller 17 performs normal operation. The "normal operation" means that the status detection unit 20 detects that the slide cellular phone 31 has been pulled out (YES at step S707), then a communication start key of the operation unit 19 is depressed (YES at step S708), thereby the status of the slide cellular phone 31 moves to communication processing in response to the incoming call (step S706).

If a call originator's telephone number has been notified (YES at step S702), the controller 17 determines whether the notified call originator's telephone number is registered in the memory 21 as a number with which communication is to start by pulling out the slide cellular phone 31 (step S703). Hereinbelow, registration of number in the memory 21 for answering to incoming call by pulling out the slide cellular phone 31 is referred to as "communication setting". Note that the registration as communication setting is previously performed by the user of the slide cellular phone 31 by operating the operation unit 19 in accordance with necessity.

If the notified call originator's telephone number is not registered (NO at step S703), the controller 17 performs the above-described normal operation.

If the notified call originator's telephone number is registered (YES at step S703), the controller 17 at step S704 informs the user that the call originator is registered in the memory 21 as the communication setting and that the status of slide cellular phone moves to communication in response to the incoming call by pulling out the slide cellular phone 31, by, e.g., displaying a message on the small-window display unit 18*a,* outputting a particular incoming-call sound, vibration by the vibration unit 22 in particular rhythm, or particular light emission by a lamp provided in the slide cellular phone 31 for this purpose. This arrangement enables the user of the slide cellular phone 31 to discriminate that the incoming call has been originated by the call originator registered in the memory 21, and prevents the user from becoming nervous upon answering to the incoming call.

If the status detection unit 20 detects that the slide cellular phone 31 has been pulled out (YES at step S705), the controller 17 moves to the communication processing in response to the incoming call (step S706), thereby the user can easily answer to the incoming call only by pulling out the slide cellular phone 21.

Note that in the third embodiment, in the slide cellular phone 31, in a case where the call originator's telephone number is notified and the number is registered in the memory 21 as the communication setting, the status of cellular phone moves to communication by pulling out the slide cellular phone 31. However, the communication setting can be changed in accordance with necessity. For example, even if a call originator's telephone call number is not notified or an incoming call has been received from a public telephone, setting may be made such that the status of cellular phone moves to communication by pulling out the slide cellular phone 31. The setting can be easily made by changing the communication settings recorded in the memory 21 by the user's operating the operation unit 19.

Further, in the third embodiment, the user is informed that the status of cellular phone moves to communication by pulling out the slide cellular phone 31 if the communication setting is made. However, it may be arranged such that the user is not informed that the status of cellular phone moves to communication by pulling out the slide cellular phone 31 if the communication setting is made.

Further, a call originator's telephone number is used as identification information. However, the identification information is not limited to a call originator's telephone number but any information can be used as long as it is notified from a network and it can be used for specifying a call originator.

[Fourth Embodiment]

Next, a fourth embodiment will be described. In the fourth embodiment, constituent elements corresponding to those of the third embodiment have the same reference numerals and explanations thereof will be arbitrarily omitted.

FIG. 4 is a block diagram showing the construction of the slide cellular phone according to a fourth embodiment. In the fourth embodiment as shown in FIG. 4, the acceleration sensor 23 is added to the construction of the first embodiment as shown in FIG. 2. The acceleration sensor 23 detects an external force applied to the slide cellular phone 31 and outputs a detected value to the controller 17.

Figure 8:
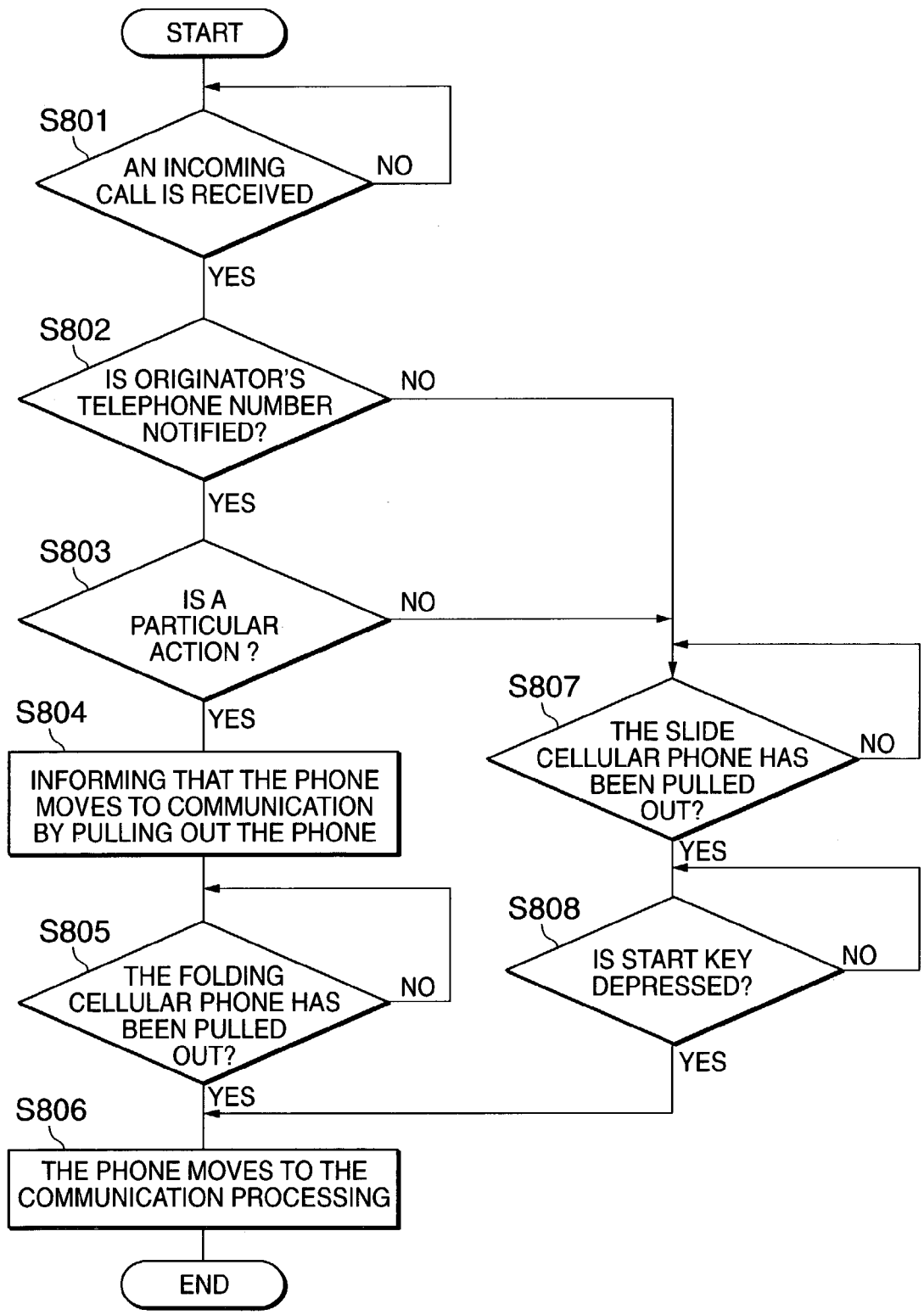
FIG. 8 is a flowchart showing an operation of the slide cellular phone according to the fourth embodiment.

FIG. 8 is a flowchart showing the operation of the slide cellular phone according to the fourth embodiment. The operations of the principal elements of the slide cellular phone 31 according to the fourth embodiment will be described in detail with reference to the flowchart of FIG. 8.

First, in a status where the slide cellular phone 31 is closed, when the antenna 11 has received a radio wave signal (YES at step S801), the controller 17 determines whether or not a call originator's telephone number has-been notified (step S802).

If a call originator's telephone number has not been notified (NO at step S802), the controller 17 performs normal operation. The "normal operation" means that the status detection unit 20 detects that the slide cellular phone 31 has been pulled out (YES at step S807), then a communication start key of the operation unit 19 is depressed (YES at step S808), thereby the status of the slide cellular phone 31 moves to communication processing in response to the incoming call (step S806).

If the call originator's telephone number has been notified (YES at step S802) and is recorded in the memory 21 such that the status of cellular phone moves to communication by detection of particular operation by the acceleration sensor 23, the controller 17 determines whether or not the acceleration sensor 23 has detected a particular action (step S803). The particular action means application of particular external force to the slide cellular phone 31 by, e.g., shaking the slide cellular phone 31 twice in a vertical direction to a display direction of the display unit 18. In this case, the direction and/or number of times of application of external force by e.g. shaking the slide cellular phone 31 can be arbitrarily and freely set.

Further, as another example of particular action, as application of external force to the slide cellular phone 31, the slide cellular phone 31 may be pulled out at a speed equal to or higher/less than a predetermined speed, or may be opened within/after a predetermined period from reception of incoming call.

The particular action is previously set by the user of the slide cellular phone 31 by operating the operation unit 19 in accordance with necessity.

If the acceleration sensor 23 has not detected the particular action (NO at step S803), the controller 17 performs the above-described normal operation.

If the acceleration sensor 23 has detected the particular action (YES at step S803), the controller 17 at step S804 informs the user that the status of cellular phone moves to communication by pulling out the slide cellular phone 31 by, e.g., displaying a message on the display unit 18, outputting a particular incoming-call sound, vibration by the vibration unit 22 in particular rhythm, or particular light emission by a lamp provided in the slide cellular phone 31 for this purpose.

If the status detection unit 20 detects that the slide cellular phone 31 has been pulled out (YES at step S805), the controller moves to the communication processing in response to the incoming call (step S806). By this arrangement, the user of the slide cellular phone 31 can select to answer or not to answer the incoming call by pulling out the slide cellular phone 31.

Note that in the fourth embodiment, if a call originator's telephone number is notified and the number is registered in the memory 21, and if the acceleration sensor 23 has detected a particular action, the status of cellular phone moves to communication in response to the incoming call by pulling out the slide cellular phone 31. However, the communication setting can be changed in accordance with necessity.

For example, even if a call originator's telephone call is unnotified or an incoming call has been received from a public telephone, setting may be made such that the status of cellular phone moves to communication by detection of particular action by the acceleration sensor 23 and pulling out the slide cellular phone 31.

Further, it may be arranged such that the status of cellular phone moves to communication by detection of particular action by the acceleration sensor 23 and pulling out the slide cellular phone 31 regardless of notification of call originator's telephone number.

Note that these settings can be easily made by changing the communication settings recorded in the memory 21 by the user's operating the operation unit 19.

Further, in the fourth embodiment, in the slide cellular phone 31, setting may be made such that the user cannot answer to an incoming call by pulling out the slide cellular phone 31 unless the acceleration sensor 23 has detected a particular action. By this arrangement, the slide cellular phone 31 can be prevented from being used by another person not authorized by the user.

Further, in the fourth embodiment, if the slide cellular phone 31 is pulled out in a case where the acceleration sensor 23 has detected a particular action, the user is informed that the status of cellular phone moves to communication by pulling out the slide cellular phone 31. However, it may be arranged such that the user is not informed that the status of cellular phone moves to communication by pulling out the slide cellular phone 31 in a case where the communication setting is made.

Note that in the above-described embodiments, the number, location, shape and the like of the respective constituent elements can be arbitrarily freely set.

As described above, according to the folding cellular phone of the present invention, in the status where the folding cellular phone is folded, if an incoming call is received from a call originator previously registered in the memory, the status of cellular phone moves to communication in response to the incoming call by opening the folding cellular phone. This enables the user to easily answer to the incoming call, and improves usability.

Further, according to the folding cellular phone of the present invention, even in the status where the folding cellular phone is folded, as the user is informed that an incoming call has been received from a call originator previously registered in the memory, the user can check the call originator to a certain degree before the user answers to the incoming call, and the usability is improved.

Further, according to the folding cellular phone of the present invention, as the user can select to answer or not to answer to an incoming call from a call originator by opening the folding cellular phone, the user can be prevented from answering to an incoming call by an erroneous operation or the like, and as a result, the usability can be improved.

According to the slide cellular phone of the present invention, in the status where the slide cellular phone is closed, if an incoming call is received from a call originator previously registered in the memory, the status of cellular phone moves to communication in response to the incoming call by pulling out the slide cellular phone. This enables the user to easily answer to the incoming call, and improves usability.

Further, according to the slide cellular phone of the present invention, even in the status where the slide cellular phone is closed, as the user is informed that an incoming call has been received from a call originator previously registered in the memory, the user can check the call originator to a certain degree before the user answers to the incoming call, and the usability is improved.

Further, according to the slide cellular phone of the present invention, as the user can select to answer or not to answer to an incoming call from a call originator by pulling out the slide cellular phone, the user can be prevented from answering to an incoming call by an erroneous operation or the like, and as a result, the usability can be improved.

What is claimed is:

1. A folding cellular phone having a foldable case, comprising:
    a status detection unit that detects whether said case is in a folded status or an opened status; and
    a control unit that automatically,
        if an incoming call is detected when said case is in the folded status, determines whether incoming call information specifying a call originator is provided from a network, and
        if said incoming call information specifying a call originator is provided, allows responding to said incoming call in response to detecting that said case has moved to the opened status, and
        if said incoming call information specifying a call originator is not provided, does not allow responding automatically to said incoming call in response to detecting that said case has moved to the opened status.

2. The folding cellular phone according to claim 1, further comprising a memory that holds identification information to identify a call originator, and
    wherein said control unit only allows automatically responding to said incoming call if said incoming call information matches identification information in said memory.

3. The folding cellular phone according to claim 1, further comprising an informing unit that informs that said incoming call will be responded to on moving said case to said opened status.

4. The folding cellular phone according to claim 1, further comprising an acceleration sensor that detects a pre-programmed particular external force, and
    wherein said control unit only allows responding automatically to said incoming call if said pre-programmed particular external force is detected with said acceleration sensor.

5. The folding cellular phone according to claim 2, further comprising an acceleration sensor that detects a particular external force, and
    wherein said control unit only allows responding automatically to said incoming call if said pre-programmed particular external force is detected with said acceleration sensor.

6. A folding cellular phone having a foldable case, comprising:
    status detection means for detecting whether said case is in a folded status or an opened status; and
    control means for automatically,
        if an incoming call is detected when said case is in the folded status, determining whether incoming call information specifying a call originator is provided from a network, and
        if said incoming call information specifying a call originator is provided, allowing responding to said incoming call in response to detecting that said case has moved to the opened status, and
        if said incoming call information specifying a call originator is not provided, not allowing responding automatically to said incoming call in response to detecting that said case has moved to the opened status.

7. The folding cellular phone according to claim 6, further comprising a memory that holds identification information to identify a call originator,and
    wherein said control means only allows automatically responding to said incoming call if said incoming call information matches identification information in said memory.

8. The folding cellular phone according to claim 6, further comprising informing means for informing that said incoming call will be responded to on moving said case to said opened status.

9. The folding cellular phone according to claim 6, further comprising acceleration detection means for detecting a pre-programmed particular external force, and
    wherein, said control means only allows responding automatically to said incoming call if said pre-programmed particular external force is detected with said acceleration detection means.

10. The folding cellular phone according to claim 7, further comprising acceleration detection means for detecting a pre-programmed particular external force, and
    wherein said control means only allows responding automatically to said incoming call if said pre-programmed particular external force is detected with said acceleration detection means.

11. A slide cellular phone used in a status where a second case which slides with respect to a first case is pulled out, upon communication, comprising:
    a status detection unit that detects whether said second case is in a closed status or a pulled out status; and
    a control unit that automatically,
        if an incoming call is detected when said second case is in the closed status, determines whether incoming call information specifying a call originator is provided by a network, and
        if said incoming call information specifying a call originator is provided, allows responding to said incoming call in response to detecting that said second case has moved to the pulled out status, and
    if said incoming call information specifying a call originator is not provided, does not allow responding automatically to said incoming call in response to detecting that said case has moved to the opened status.

12. The slide cellular phone according to claim 11, further comprising a memory that holds identification information to identify a call originator, and wherein said control unit only allows automatically responding to said incoming call if said incoming call information matches identification information in said memory.

13. The slide cellular phone according to claim 11, further comprising an informing unit that informs that said incoming call will be responded to on moving said case to said opened status.

14. The slide cellular phone according to claim 11, further comprising an acceleration sensor that detects a pre-programmed particular external force, and
wherein said control unit only allows responding automatically to said incoming call if said pre-programmed particular external force is detected with said acceleration sensor.

15. The slide cellular phone according to claim 12, further comprising an acceleration sensor that detects a pre-programmed particular external force, and
wherein said control unit only allows responding automatically to said incoming call if said pre-programmed particular external force is detected with said acceleration sensor.

16. A slide cellular phone used in a status where a second case which slides with respect to a first case is pulled out, upon communication, comprising:
status detection means for detecting whether said second case is in a closed status or a pulled out status; and
control means for automatically,
if an incoming call is detected when said case is in the closed status, determining whether incoming call information specifying a call originator is provided from a network, and
if said incoming call information specifying a call originator is provided, allowing responding to said incoming call in response to detecting that said second case has moved to the pulled out status, and
if said incoming call information specifying a call originator is not provided, not allowing responding automatically to said incoming call in response to detecting that said case has moved to the opened status.

17. The slide cellular phone according to claim 16, further comprising a memory that holds identification information to identify a call originator, and
wherein said control means only allows automatically responding to said incoming call if said incoming call information matches identification information in said memory.

18. The slide cellular phone according to claim 16, further comprising informing means for informing that said incoming call will be responded to on moving said case to said opened.

19. The slide cellular phone according to claim 16, further comprising acceleration detection means for detecting a pre-programmed particular external force, and
wherein said control means only allows responding automatically to said incoming call if said pre-progranimed particular external force is detected with said acceleration detection means.

20. The slide cellular phone according to claim 17, further comprising acceleration detection means for detecting a particular external force,
wherein said control means only allows responding automatically to said incoming call if said pre-programmed particular external force is detected with said acceleration detection means.

21. The folding cellular phone according to claim 1, wherein said incoming call information is identification information specifying at least one of a call originator of said incoming call, or a telephone number of said call originator.

22. The folding cellular phone according to claim 21 further comprising a display positioned on an exterior of said foldable case for displaying said identification information.

23. The folding cellular phone according to claim 6, wherein said incoming call information is identification information specifying at least one of a call originator of said incoming call, or a telephone number of said call originator.

24. The folding cellular phone according to claim 23 further comprising a display positioned on an exterior of said foldable case for displaying said identification information.

25. The slide cellular phone of claim 11 wherein said incoming call information is identification information specifying at least one of a call originator of said incoming call, or a telephone number of said call originator.

26. The slide cellular phone according to claim 25 further comprising a display positioned on one of said first case and said second case for displaying said identification information.

27. The slide cellular phone of claim 16 wherein said incoming call information is identification information specifying at least one of a call originator of said incoming call, or a telephone number of said call originator.

28. The slide cellular phone according to claim 27 further comprising a display positioned on one of said first case and said second case for displaying said identification information.

29. The folding cellular phone according to claim 1, further comprising an operation unit that is configured to be operated by a user,
wherein said control unit responds to said incoming call upon operation of said operation unit if
said incoming call information has not been notified, and
said status detection unit detects that said case is in said opened status.

30. The folding cellular phone according to claim 6, further comprising an operation unit that is configured to be operated by a user,
wherein said control unit responds to said incoming call upon operation of said operation unit if
said incoming call information has not been notified, and
said status detection unit detects that said case is in said opened status.

31. The slide cellular phone of claim 11, further comprising an operation unit that is configured to be operated by a user,
wherein said control unit responds to said incoming call upon operation of said operation unit if
said incoming call information has not been notified, and
said status detection unit detects that said second case has moved to the pulled out status.

32. The slide cellular phone of claim 16, further comprising an operation unit that is configured to be operated by a user,
wherein said control unit responds to said incoming call upon operation of said operation unit if
said incoming call information has not been notified, and
said status detection unit detects that said second case has moved to the pulled out status.

* * * * *